GROUNDING CLIP

Filed Sept. 29, 1967 2 Sheets-Sheet 1

Inventors
Edmund J. Soltysik
Francis E. Ryder
By: Olson, Trexler, Wolters & Bushnell attys.

GROUNDING CLIP

Filed Sept. 29, 1967 2 Sheets-Sheet 2

Inventors
Edmund J. Soltysik
Francis E. Ryder
By: Olson, Trexler, Wolters & Bushnell attys.

United States Patent Office 3,486,158

Patented Dec. 23, 1969

3,486,158
GROUNDING CLIP

Edmund J. Soltysik, Chicago, and Francis E. Ryder, Des Plaines, Ill., assignors to Illinois Tool Works Inc., Chicago, Ill., a corporation of Delaware Filed Sept. 29, 1967, Ser. No. 671,733
Int. Cl. H01r *3/06, 11/20;* H05k *1/00*
U.S. Cl. 339—14 11 Claims

ABSTRACT OF THE DISCLOSURE

There is disclosed a clip for mounting a printed circuit panel to a chassis. The clip includes points for engaging both the printed circuit and the chassis when fully assembled for accomplishing an electrical contact.

The present invention relates to mounting clips, and more specifically to clips for mounting one workpiece with respect to another and simultaneously establishing an electrical connection.

While clips incorporating features of the present invention may be adapted for a variety of installations, they are especially suitable for mounting and grounding an electrical component such as a printed circuit board with respect to a metal portion of a chassis.

It is an important object of the present invention to provide a novel mounting and grounding clip adapted to be made from sheet metal and to be quickly and easily assembled with workpieces such as a printed circuit board and a chassis.

A more specific object of the present invention is to provide a novel grounding clip which is constructed for insuring a positive and effective electrical connection upon being assembled with workpieces such as a printed circuit board and a chassis.

Still another specific object of the present invention is to provide a novel sheet metal grounding clip adapted to be connected to a pair of workpieces and constructed for presenting points for digging into such workpieces and assuring electrical connection therewith when the clip is assembled with the workpieces.

Still another object of the present invention is to provide a novel sheet metal grounding clip of the above described type for assembly with a pair of workpieces and constructed for receiving a complementary fastener such as a screw which cooperates with portions of the clip for positively securing the clip with respect to both of said workpieces.

Other objects and advantages of the present invention will become apparent from the following description and the accompanying drawings wherein.

Figures 1, 2, 3, 4, 5:
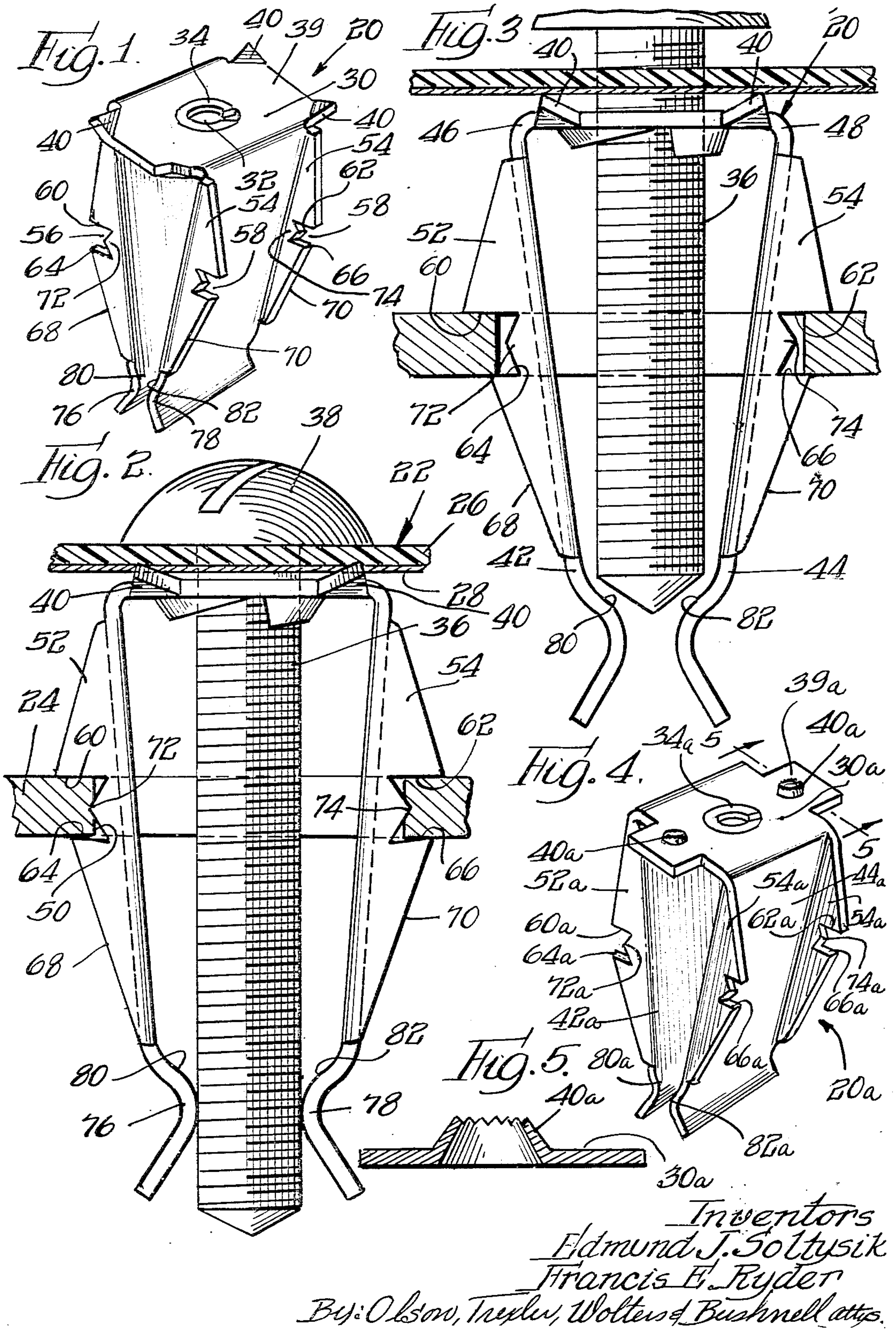
FIG. 1 is a perspective view showing a mounting and grounding clip incorporating features of the present invention.
FIG. 2 is an enlarged partial sectional view showing an assembly comprising workpieces such as a printed circuit panel and a chassis which are secured and electrically connected with each other by means comprising the clip of FIG. 1 and a complementary fastener or screw.
FIG. 3 is a view similar to FIG. 2 but shows the products in a partially assembled condition and prior to complete tightening of the screw.
FIG. 4 is a perspective view showing a slightly modified form of the present invention.
FIG. 5 is an enlarged sectional view taken along line 5—5 in FIG. 4.

Referring now more specifically to the drawings wherein like parts are designated by the same numerals throughout the various figures, a mounting and grounding clip 20 incorporating features of the present invention is shown in FIGS. 1–3. The clip is formed from sheet metal, preferably by a stamping process, and is adapted to interconnect a pair of workpieces 22 and 24.

As previously indicated, the clip 20 may be adapted for use in various installations. As an illustration of one such installation, it is contemplated that the workpiece 22 may be a printed circuit board while the workpiece 24 may be a sheet metal part of an electrical chassis. The printed circuit board comprises a sheet 26 of electrical insulating material having a circuit element 28 of copper or the like thereon. The clip 20 is constructed so as to provide a grounding electrical connection between the circuit element 28 and the chassis 24.

The clip 20 is formed so as to include a central head or base portion 30 against which the workpiece or printed circuit panel 26 is adapted to rest. A central aperture 32 is provided in the head or base section 30 and is defined by a helically deformed edge 34 which is adapted to cooperate with the threaded shank 36 of a complementary fastener or screw 38 for securing the parts together as will be described below.

In order to insure the establishment of a proper electrical connection between the clip and the workpiece 22, points or barbs are formed on the head or base portion 30 and project above the generally planar upper surface thereof for engaging and digging into the circuit element 28 when the screw is tightened for clamping the workpiece 22 against the head portion 30. In this embodiment, the points or barbs are in the form of diagonally upwardly inclined sections 40 at corners of relatively unsupported and resilient portions 39 of the generally rectangular base 30. The diagonally inclined arrangement of the points or barbs 40 enables them to dig aggressively into the circuit element 28 as shown in FIG. 2 and further enables them to provide a spring action when the panel is clamped under the pressure of the screw. Thus, the base or head 30 with its diagonally inclined corners 40 and portions 39 functions in a manner similar to a lock washer for resisting retrograde rotation and loosening of the screw.

Leg sections 42 and 44 extend from integral junctions 46 and 48 respectively with opposite margins of the head or base 30. The leg sections extend generally axially with respect to the axis of the screw opening 32 and at the same time converge toward their free ends. The chassis 24 is formed with an opening 50 therein through which the legs are adapted to be inserted when the clip is assembled with the chassis as shown in FIGS. 2 and 3.

In order to secure the clip with respect to the chassis, chassis engaging wings 52 and 54 project laterally from opposite longitudinal margins of the leg sections. These wings or flanges have notches 56 and 58 therein for receiving an edge portion of the chassis defining the opening 50. These notches are respectively defined by edges or shoulders 60 and 62 facing away from the head or base section 30 and opposed edges or shoulders 64 and 66. The shoulders 64 and 66 have a lateral dimension less than that of the shoulders 60 and 62. In addition, longitudinal edges 68 and 70 of the wings or flanges extend in converging relationship from the shoulders 64 and 66 so as to facilitate entry of the leg sections through the opening 50 and snapping of the shoulders 64 and 66 beneath the chassis panel.

The flanges or wings 52 and 54 are formed with points or barbs 72 and 74 which define the bottoms of the respective notches 56 and 58. These points or barbs are adapted to be impinged against and dig into edges of the chassis opening 50 for insuring an effective electrical connection between the clip and the chassis. After the leg sections of the clip are inserted sufficiently through the chassis opening to permit the shoulders 64 and 66 to engage beneath the edge, the inherent resiliency of the spring metal utilized for the clip causes the leg sections to spring away from each other for urging the points or barbs 72 and 74 into engagement with the chassis.

While the spring action of the leg sections may be sufficient for maintaining the clip in assembled relationship with and in electrical contact with the chassis in many installations, the clip is constructed for utilizing the fastener shank 36 for positively precluding accidental disengagement. More specifically, free end portions 76 and 78 of the leg sections converge sharply toward each other for providing cam surfaces 80 and 82 respectively. As shown in FIG. 3, the cam surfaces are arranged so that the minimum dimension therebetween is less than the diameter of the screw shank. Furthermore, the length of the screw shank is sufficient so that when the screw is fully assembled as shown in FIG. 2, the shank extends between the cam surfaces 80 and 82 and wedges the leg sections 42 and 44 away from each other for aggressively and positively urging the points or barbs 72 and 74 into engagement with the edge of the chassis.

FIGS. 4 and 5 show a clip constructed in accordance with a slightly modified form of the present invention. This clip is similar to the construction described above as indicated by the application of identical reference numerals with the suffix *a* added to corresponding elements. In this embodiment, the points or barbs 40*a* are in the form of annular extrusions punched from the head or base section 30*a*. It will be noted that the points or barbs 40*a* are located in portions 39*a* of the base or head which project laterally outwardly of opposite edges of the leg sections as are the points or barbs 40 of the previously described embodiment. These portions of the base are relatively unsupported by the leg sections so as to provide a portion of the spring action aiding and locking the screw against an undesired retrograde rotation.

Figures 6, 7, 8, 9, 10, 11, 12:
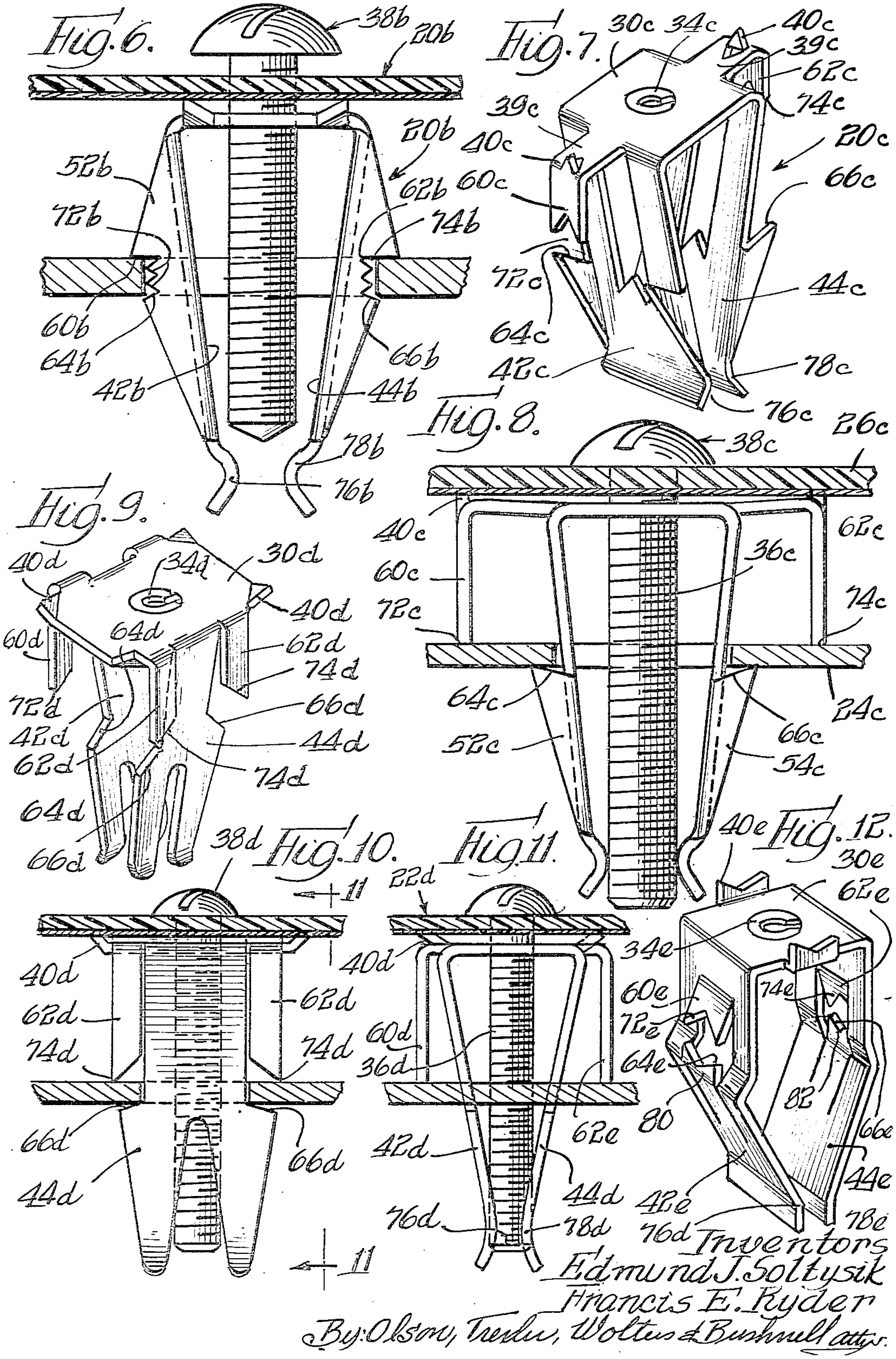
FIG. 6 is a view similar to FIG. 3 but shows a slightly modified form of the present invention.
FIG. 7 is a perspective view showing another embodiment of the present invention.
FIG. 8 is a partial sectional view showing the clip of FIG. 7 assembled with a pair of workpieces.
FIG. 9 is a perspective view showing still another embodiment of the present invention.
FIG. 10 is a partial sectional view showing the clip of FIG. 9 mounted in assembled relationship with a pair of workpieces.
FIG. 11 is a sectional view taken along line 11—11 in FIG. 10.
FIG. 12 is a perspective view of the clip incorporating another embodiment of the present invention.

FIG. 6 discloses a clip 20*b* which is essentially identical to the previously described clip 20 as indicated by the application of identical reference numerals with the suffix *b* added to corresponding elements. This embodiment differs only in that a plurality of relatively small points or barbs 72*b* and 74*b* are formed at the bottoms of the notches 56*b* and 58*b* for engaging the edge of the chassis.

FIGS. 7 and 8 show another clip incorporating features of the present invention and having elements corresponding to the clips described above as indicated by the application of identical reference numerals with the suffix *c* added to corresponding parts. In this embodiment, the upper shoulders 60 and 62 of the previously described forms have been removed from the wings or flanges projecting from the legs and have been replaced by finger elements 60*c* and 62*c* which are struck from central portions of the legs 42*c* and 44*c*. These finger elements present downwardly facing barbs or points 72*c* and 74*c* which are not only adapted to impinge the chassis for establishing electrical connection, but are also disposed in opposing relationship to the shoulders 64*c* and 66*c* on the wings for retaining the clip in assembled relationship with the chassis.

The finger elements 60*c* and 62*c* not only include portions projecting downwardly for presenting the barbs or points for engagement with the chassis, but they also include laterally extending portions 39*c* from which points or barbs 40*c* are struck for impinging against and establishing electrical connection with the workpiece or printed circuit panel 26*c* as shown in FIG. 8.

FIGS. 9–11 show another embodiment of the present invention wherein elements corresponding to those of the devices described above are identified by the same reference numerals with the suffix *d* added. In this embodiment pairs of finger elements 60*d* and 62*d* are struck from marginal portions of the legs 42*d* and 44*d*. In addition, the wing elements are eliminated from the leg sections, but shoulders 64*d* and 66*d* are formed on the longitudinal edges of the leg sections in cooperative opposing relationship with respect to the finger elements 60*d* and 62*d* for securing the clip with respect to the chassis as shown in FIGS. 10 and 11.

In FIG. 12 there is shown a further embodiment of the present invention wherein elements corresponding to those described above are identified by the same reference numerals with the suffix *e* added. In this embodiment, finger elements 60*e* and 62*e* are struck from the leg sections and extend diagonally downwardly for presenting their barbs or points for engagement with the outer surface of the chassis. In addition, the shoulders 64*e* and 66*e* are formed on flexible finger elements 80 and 82 struck from the leg sections and extending in opposing relationship with respect to the finger elements 60*e* and 62*e*.

While preferred embodiments of the present invention have ben shown and described herein, it is obvious that many structural details may be changed without departing from the spirit and scope thereof.

The invention is claimed as follows:

1. A sheet metal grounding clip for connecting a first workpiece to a second workpiece comprising head means adapted to be connected to said first workpiece, leg means comprising a pair of leg sections extending generally axially in opposed spaced relationship from generally opposite margins of said head means for insertion through an opening in said second workpiece, elements on said leg means for engaging said second workpiece adjacent said opening for securing the clip with respect to said second workpiece, projections on and extending from at least one of said means for making electrical contact with said second workpiece, additional projections extending from said head means generally oppositely from said leg means for engaging and making electrical contact with said first workpiece, said leg sections including laterally extending wings, and said elements comprising shoulder surfaces on said wings for engaging beneath said second workpiece.

2. A clip, as defined in claim 1, wherein said elements include additional shoulder surfaces on said leg sections axially spaced from and opposing said first mentioned shoulder surfaces for engaging above said second workpiece.

3. A clip, as defined in claim 2, wherein said projections include points on said leg sections between said first and second mentioned shoulder surfaces for engaging an edge of said second workpiece.

4. A clip, as defined in claim 3, which includes a plurality of said points on said leg sections between the opposing shoulder surfaces.

5. A clip, as defined in claim 1, wherein said head means includes an aperture therethrough and helical thread means for accommodating a screw having an elongated shank for connecting said first workpiece with said head means, said leg sections including converging portions engageable by said screw shank for spreading the leg sections for positive engagement with said second workpiece.

6. A sheet metal grounding clip for connecting a first workpiece to a second workpiece comprising head means adapted to be connected to said first workpiece, leg means comprising a pair of leg sections extending in opposed spaced relationship generally axially from generally opposite margins of said head means for insertion through an opening in said second workpiece, elements on at least certain of said means for engaging said second workpiece adjacent said opening for securing said clip with respect to said second workpiece, and projections on and extending from at least one of said means for making electrical contact with said second workpiece, said leg sections including laterally extending wings having notches therein for receiving an edge of said second workpiece, said elements comprising first and second shoulder surfaces defining opposite sides of said notches and said projections including points defining bottom portions of said notches.

7. A sheet metal grounding clip for connecting a first workpiece to a second workpiece comprising head means adapted to be connected to said first workpiece, leg means extending generally axially from said second head means for insertion through an opening in said workpiece, elements on at least certain of said means for engaging said second workpiece adjacent said opening for securing said clip with respect to said second workpiece, and projections on and extending from at least one of said means for making electrical contact with said second workpiece, said elements including finger elements struck from said leg means and extending downwardly from said head means, and shoulder surfaces on said leg sections in generally opposing relationship with respect to said finger elements.

8. A sheet metal grounding clip for connecting a first workpiece to a second workpiece comprising head means adapted to be connected to said first workpiece, leg means extending generally axially from said head means for insertion through an opening in said second workpiece, elements on at least certain of said means for engaging said second workpiece adjacent said opening for securing said clip with respect to said second workpiece, and projections on and extending from at least one of said means for making electrical contact with said second workpiece, said elements including finger elements struck from said leg means and said projections including points on said finger elements.

9. A one-piece resilient sheet metal mounting and grounding clip for connecting a first workpiece such as a printed circuit board to a second workpiece such as a metal chassis having an opening therein, comprising a head section having a central aperture therethrough, said head section including helical means defining said aperture for accommodating a screw having an elongated threaded shank for securing said first workpiece against said head section, projections on said head section for impinging said first workpiece and making electrical contact therewith, a pair of spaced apart opposing leg sections extending generally axially from integral junctions with opposite margins of said head section for insertion through said opening in said second workpiece, each of said leg sections including laterally outwardly projecting wings extending from longitudinal margins thereof, said wings having notches therein for receiving an edge of said second workpiece defining said opening, said wings including shoulder surfaces defining opposite sides of said notches for engaging above and below said second workpiece and securing the clip with respect thereto, and said wings including points projecting in said notches for impinging said second workpiece and making electrical contact therewith.

10. A clip, as defined in claim 9, wherein said head section includes resilient portions, said projections of said head section being located on said resilient portions for providing a yieldable locking action between said first workpiece and said screw.

11. A clip, as defined in claim 9, wherein said leg sections include converging portions adjacent free ends thereof engageable by said screw shank for spreading said leg sections and positively urging said projections on said wings into engagement with said second workpiece.

References Cited

UNITED STATES PATENTS

| | | | |
|---|---|---|---|
| 1,881,836 | 10/1932 | Mitchell ------------- | 85—80 |
| 2,707,013 | 4/1955 | Flora et al. ---------- | 85—80 |
| 2,873,496 | 2/1959 | Elms. | |
| 2,970,287 | 1/1961 | Gill. | |
| 3,343,441 | 9/1967 | Van Buren ----------- | 85—80 |

MARVIN A. CHAMPION, Primary Examiner

PATRICK A. CLIFFORD, Assistant Examiner.

U.S. Cl. X.R.

339—17, 95

UNITED STATES PATENT OFFICE

CERTIFICATE OF CORRECTION

Patent No. 3,486,158 Dated December 23, 1969

Inventor(s) Edmund J. Soltysik and Francis E. Ryder

It is certified that error appears in the above-identified patent and that said Letters Patent are hereby corrected as shown below:

Column 5, line 20, after "said" the word "second" should be deleted.

SIGNED AND SEALED
JUL 28 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334